(12) United States Patent
Johansson et al.

(10) Patent No.: US 12,390,035 B2
(45) Date of Patent: Aug. 19, 2025

(54) METHOD FOR POSITIONING AN EMPTY GARMENT HANGER IN AN INDIVIDUAL MOUNTING

(71) Applicant: JENSEN SWEDEN AB, Borås (SE)

(72) Inventors: Johan H P Johansson, Borås (SE); Kenny Wern, Borås (SE); Lars Follin, Bredared (SE); Leif Bertilsson, Borås (SE); Per-Olov Nilsson, Borås (SE)

(73) Assignee: JENSEN SWEDEN AB, Borås (SE)

( * ) Notice: Subject to any disclaimer, the term of this patent is extended or adjusted under 35 U.S.C. 154(b) by 48 days.

(21) Appl. No.: 17/905,606

(22) PCT Filed: Mar. 3, 2021

(86) PCT No.: PCT/SE2021/050186
§ 371 (c)(1),
(2) Date: Sep. 2, 2022

(87) PCT Pub. No.: WO2021/177886
PCT Pub. Date: Sep. 10, 2021

(65) Prior Publication Data
US 2023/0112686 A1   Apr. 13, 2023

(30) Foreign Application Priority Data
Mar. 3, 2020 (SE) .................... 2050236-5

(51) Int. Cl.
*A47G 25/14* (2006.01)
*A47G 25/40* (2006.01)
(Continued)

(52) U.S. Cl.
CPC ....... *A47G 25/1442* (2013.01); *A47G 25/145* (2013.01); *A47G 25/4023* (2013.01);
(Continued)

(58) Field of Classification Search
CPC ............. A47G 25/1442; A47G 25/145; A47G 25/4023; B65G 1/0457; B65G 1/10;
(Continued)

(56) References Cited

U.S. PATENT DOCUMENTS

| 6,206,178 | B1* | 3/2001 | Jacobson | ............... | B65G 47/61 |
| | | | | | 198/465.4 |
| 7,055,673 | B2* | 6/2006 | Jacobson | ............... | B65G 47/61 |
| | | | | | 198/530 |
| 2003/0019891 | A1* | 1/2003 | Hutterly | .................. | D06F 95/00 |
| | | | | | 223/51 |

FOREIGN PATENT DOCUMENTS

| AU | 5130396 A | * 10/1996 |
| CN | 106251183 | 12/2016 |

(Continued)

OTHER PUBLICATIONS

"European Application Serial No. 21764203.2, European Search Report dated Dec. 11, 2023", (Dec. 11, 2023), 10 pgs.

(Continued)

*Primary Examiner* — Gene O Crawford
*Assistant Examiner* — Abby A Jorgensen
(74) *Attorney, Agent, or Firm* — Schwegman Lundberg & Woessner, P.A.

(57) ABSTRACT

A method for positioning an empty garment hanger in an individual mounting position can comprise picking up an empty garment hanger at a loading station with a gripping tool, reading a data signal identifying a garment that is to be hung on the garment hanger, moving the empty garment hanger to a mounting station, adjusting the position of the garment hanger in dependency of the data signal, and holding the garment hanger in the individual mounting position.

19 Claims, 3 Drawing Sheets

(51) Int. Cl.
*B65G 1/04* (2006.01)
*B65G 1/10* (2006.01)
*B65G 47/61* (2006.01)
*B65G 47/90* (2006.01)
*D06F 95/00* (2006.01)

(52) U.S. Cl.
CPC ............. *B65G 1/0457* (2013.01); *B65G 1/10* (2013.01); *B65G 47/61* (2013.01); *B65G 47/902* (2013.01); *D06F 95/00* (2013.01); *B65G 2201/0229* (2013.01)

(58) Field of Classification Search
CPC ................. B65G 47/61; B65G 47/902; B65G 2201/0229; D06F 95/00; D06F 67/04
See application file for complete search history.

(56) References Cited

FOREIGN PATENT DOCUMENTS

| | | | | |
|---|---|---|---|---|
| CN | 205874790 | | 1/2017 | |
| CN | 108515032 | | 9/2018 | |
| CN | 207827247 | | 9/2018 | |
| DE | 2644424 A | * | 4/1977 | ............. B65G 33/02 |
| DE | 3535297 A | * | 4/1987 | ............. B65G 47/61 |
| DE | 3535297 A1 | * | 4/1987 | |
| DE | 102005006067 A1 | * | 8/2006 | ............. B65G 47/49 |
| EP | 0456051 A2 | * | 11/1991 | |
| EP | 0566553 A1 | * | 10/1993 | |
| EP | 2372016 A1 | * | 10/2011 | ......... B65G 47/5104 |
| EP | 3178986 A1 | * | 6/2017 | ............. B65G 47/50 |
| FR | 2329547 A1 | * | 5/1997 | |
| JP | 0370600 | | 3/1991 | |
| JP | H0370600 B2 | * | 11/1991 | |
| JP | 09122400 A | * | 5/1997 | |
| JP | H09122400 A | * | 5/1997 | |
| JP | 2012210322 | | 11/2012 | |
| JP | 2012210322 A | * | 11/2012 | |
| NL | 1016462 C2 | * | 4/2002 | ......... A47G 25/4023 |
| WO | WO-9110610 A1 | * | 7/1991 | |
| WO | WO-9312893 A1 | * | 7/1993 | ............. B07C 5/3412 |
| WO | WO-9629267 A1 | * | 9/1996 | ............. B65G 47/61 |
| WO | WO-9854075 A1 | * | 12/1998 | ............. B65G 47/61 |
| WO | WO-0051918 A1 | * | 9/2000 | ............. B65G 17/20 |

OTHER PUBLICATIONS

"International Application Serial No. PCT/SE2021/050186, International Search Report dated Apr. 23, 2021", (Apr. 23, 2021), 5 pgs.
"International Application Serial No. PCT/SE2021/050186, Written Opinion dated Apr. 23, 2021", (Apr. 23, 2021), 7 pgs.
"Chinese Application No. 2021800320582, Office Action dated Dec. 2, 2024", w English Translation, (Dec. 2, 2024), 16 pgs.
"Chinese Application No. 202180032101.5, Office Action dated Mar. 20, 2025", w English Translation, (Mar. 20, 2025), 20 pgs.
"Chinese Application No. 202180032058.2, Office Action dated Jun. 3, 2025", w English Translation, (Jun. 3, 2025), 11 pgs.

* cited by examiner

METHOD FOR POSITIONING AN EMPTY GARMENT HANGER IN AN INDIVIDUAL MOUNTING

PRIORITY APPLICATIONS

This application is a U.S. National Stage Filing under 35 U.S.C. § 371 from International Application No. PCT/SE2021/050186, filed on Mar. 3, 2021, and published as WO2021/177886 on Sep. 10, 2021, which claims the benefit of priority to Swedish Application No. 2050236-5, filed on Mar. 3, 2020; the benefit of priority of each of which is hereby claimed herein, and which applications and publication are hereby incorporated herein by reference in their entireties.

TECHNICAL FIELD

The present invention relates to a garment hanger handling device, where a gripping tool forwards garment hangers from a pick-up position to a mounting position, where a garment is hung on the garment hanger, and where the garment hanger thereafter is sent away from the device for further handling.

BACKGROUND ART

There are many different material handling systems consisting of conveyor systems and conveyor installations including more or less intelligent control systems for handling and transporting goods, e.g. clothes or garments, between different work positions in the handling of goods that require several work steps. In one type of material handling system, the conveyor system consists of a main conveyor, which in turn can consist of a plurality of conveyors, and a plurality of side conveyors. A side conveyor selectively leads workpieces from the main conveyor to work stations where one or more work steps are performed on the workpiece, after which the workpiece is returned to the main conveyor with the aid of the side conveyor.

A particular type of material handling system comprises a conveyor system in which garment hangers are conveyed between different positions. The garment hangers may be conveyed with or without a garment. In a system that conveys garment hangers with a garment, the garment must be hang on the garment hanger in a mounting station, where an operator hangs a garment on the garment hanger and then forwards it to further handling stations, e.g. for washing, folding, repair, sorting and for delivery to a customer. Normally, the garment hanger is held in a specific mounting position such that the operator can hang the garment on the garment hanger.

The garment hangers are often conveyed by conveyor rails that are arranged above the operator position. At a loading station, the empty garment hanger is moved down from the main conveyor, which is located at an upper level, down to the loading position, which is located at a lower level, with the aid of e.g. a conveyor chain, conveyor belt or a rail. When the hanging of a garment has been carried out, a conveyor may transport the garment hanger with the garment up to the main conveyor again for continued transport of the garment hanger to a next operation station.

NL 1016462 C2 discloses a garment handling device provided with a garment hanger holding device. The garment hanger holding device can be moved along two horizontal directions and along a vertical direction. The garment hanger holding device can in this way pick up a folded garment hanger from a first station, move it close to an operator which treads a garment on the garment hanger through the neckline. The garment hanger is then unfolded and the garment hanger with the garment is forwarded to a second station.

Such conventional loading stations often functions properly. There is however still room for improvements.

DISCLOSURE OF THE INVENTION

The object of the invention is therefore to provide a method for positioning an empty garment hanger in an individual mounting position.

The solution according to the invention is described in the characterizing part of claim 1. The other claims contain advantageous embodiments and developments of the method.

In a method for positioning an empty garment hanger in an individual mounting position, the steps of: picking up an empty garment hanger at a loading station with a gripping tool, reading a data signal identifying a garment that is to be hung on the garment hanger, moving the empty garment hanger to a mounting station, adjusting the position of the garment hanger in dependency of the data signal, and holding the garment hanger in the individual mounting position are comprised.

With the inventive method, each garment hanger can be positioned in an individual position in dependency of the garment that is to be hung on the garment hanger. By adapting the mounting position to the actual garment, a flexible mounting method for garments are provided, where each garment can be hung in an optimal manner, where the mounting position may be adapted to the actual garment and to the operator hanging the garment. The mounting position may e.g. be adjusted in a vertical direction, such that the height of the garment hanger can be optimized for the actual garment. The mounting position may also be adjusted in a rotational direction around a vertical axis, such that the rotational direction of the garment hanger can be optimized for the actual garment.

The method is in one example performed by a garment hanger handling device comprising a housing and a gripping tool adapted to grip and hold a garment hanger, where the gripping tool is adapted to pick up a garment hanger at a loading station, to move the garment hanger to a mounting station, and to forward the garment hanger to an unloading station. The garment hanger handling device is provided with a linear actuator adapted to move the gripping tool in a vertical direction, and a rotational actuator adapted to rotate the gripping tool around a vertical centre axis of the garment hanger handling device.

The garment hanger handling device can pick up an empty garment hanger at a loading station and move it to a mounting station, where an operator will hang a garment on the garment hanger. When the garment is hung, the gripping tool will move the garment hanger with the garment to an unloading station, where the garment hanger will be loaded on a conveyor that will convey the garment hanger for further handling.

At the mounting station, the gripping tool can position the empty garment hanger in a predefined vertical position, such that the height of the garment hanger at the mounting station can be set to a predefined height. The gripping tool can further position the empty garment hanger in a predefined rotational position around the vertical axis, such that the orientation of the empty garment hanger can be selected. The gripping tool is able to position the empty garment hanger in the predefined mounting position at the mounting station in dependency of an input signal identifying the garment, such that the mounting position can be adapted to the actual garment that is to be hung on the garment hanger and to the operator hanging the garment. The gripping tool can further adapt the rotational orientation of the garment hanger and can present the garment hanger in a folded/collapsed or unfolded/normal state at the mounting position.

This will allow the garment hanger handling device to position an empty garment hanger in an optimal predefined position at the mounting station, where the predefined position is e.g. adapted to the actual garment that is to be hung on the garment hanger and to the length of the operator hanging the garment. This will simplify the hanging of garments at the mounting station and will increase the efficiency of the handling device. The ergonomics for the operator will also be improved.

The garment hanger handling device comprises at least one data input device. The data input device is adapted to receive a signal indicative of the desired predefined mounting position. The data input device may e.g. receive information from a data reader. The data reader may be arranged at the loading station or at the mounting station. The data reader is adapted to read information from a data holder, such as an RFID-tag or a bar code, arranged on a garment hanger and/or on a garment. The data holder comprises information about the garment hanger or the garment, e.g. the type of garment hanger, the destination of the garment hanger, the type of garment, the destination of the garment, the size or type of the garment etc. This information is used to position the empty garment hanger in the desired mounting position at the mounting station, and can also be used to load the equipped garment hanger on a correct outbound conveyor.

The data input device may also receive information from a user interface, where an operator can select the predefined mounting position. The user interface may e.g. comprise a number of dedicated buttons, where each button corresponds to a specific garment. The user interface may also comprise a menu system where each menu selection corresponds to a specific garment.

BRIEF DESCRIPTION OF THE FIGURES

The invention will be described in more detail below with reference to the embodiments shown in the attached drawings, in which.

DESCRIPTION OF EMBODIMENTS

The embodiments of the invention that are described below, along with developments thereof, are to be understood only as examples and do not in any way limit the scope of protection of the claims.

Figure 1:
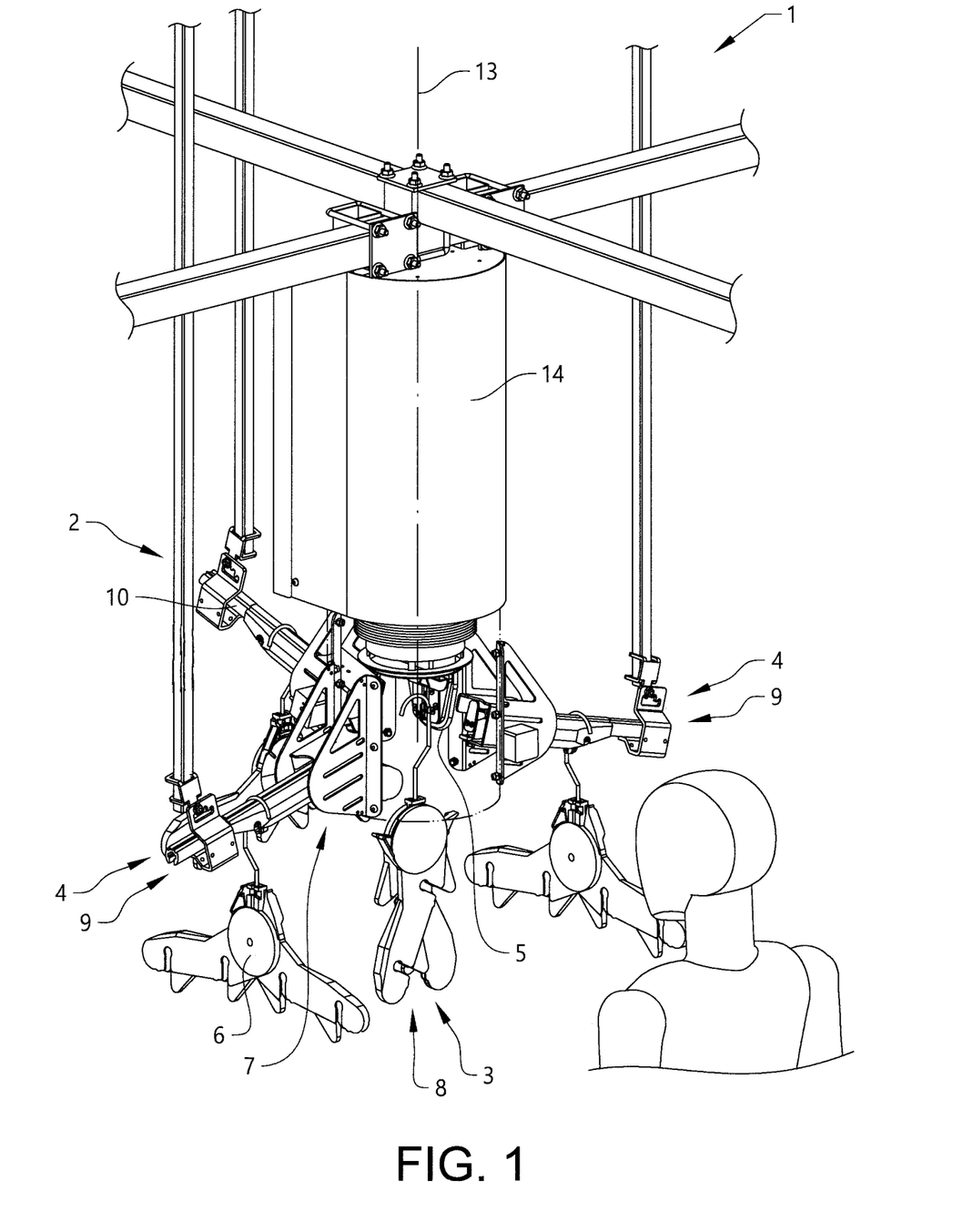
FIG. 1 shows an example of a garment hanger handling device.

FIG. 1 shows a garment hanger handling device 1. The garment hanger handling device comprises a housing 14 and a gripping tool 5, shown in FIG. 2. The gripping tool is adapted to pick up a garment hanger 6 at a loading station 2, to move the garment hanger to a mounting station 3, and to forward the garment hanger to an unloading station 4. In the shown example, the garment hanger handling device is arranged in a conveyor system 50 comprising a loading station 2 and two unloading stations 4. The loading station 2 comprises a rail 10 that leads an empty garment hanger to a pick-up position 7 in which it is picked up by the gripping tool 5. The loading station 2 receives empty garment hangers from an infeed conveyor, which places garment hangers on the inclined rail 10 that will forward a garment hanger to the pick-up position 7. The loading station preferably comprises a holding device that will receive and hold a garment hanger such that it can be picked up by the gripping tool. When the gripping tool 5 is to pick up a garment hanger at the loading device, the holding device is extended towards the pick-up position 7, such that the holding device is positioned at the pick-up position 7. This simplifies the design of the gripping tool, since the gripping tool must not be able to move horizontally to the pick-up position or to the release position. In the shown example, the loading station is attached to the housing, but the loading station may also be stand-alone and arranged adjacent the housing.

Figure 2:
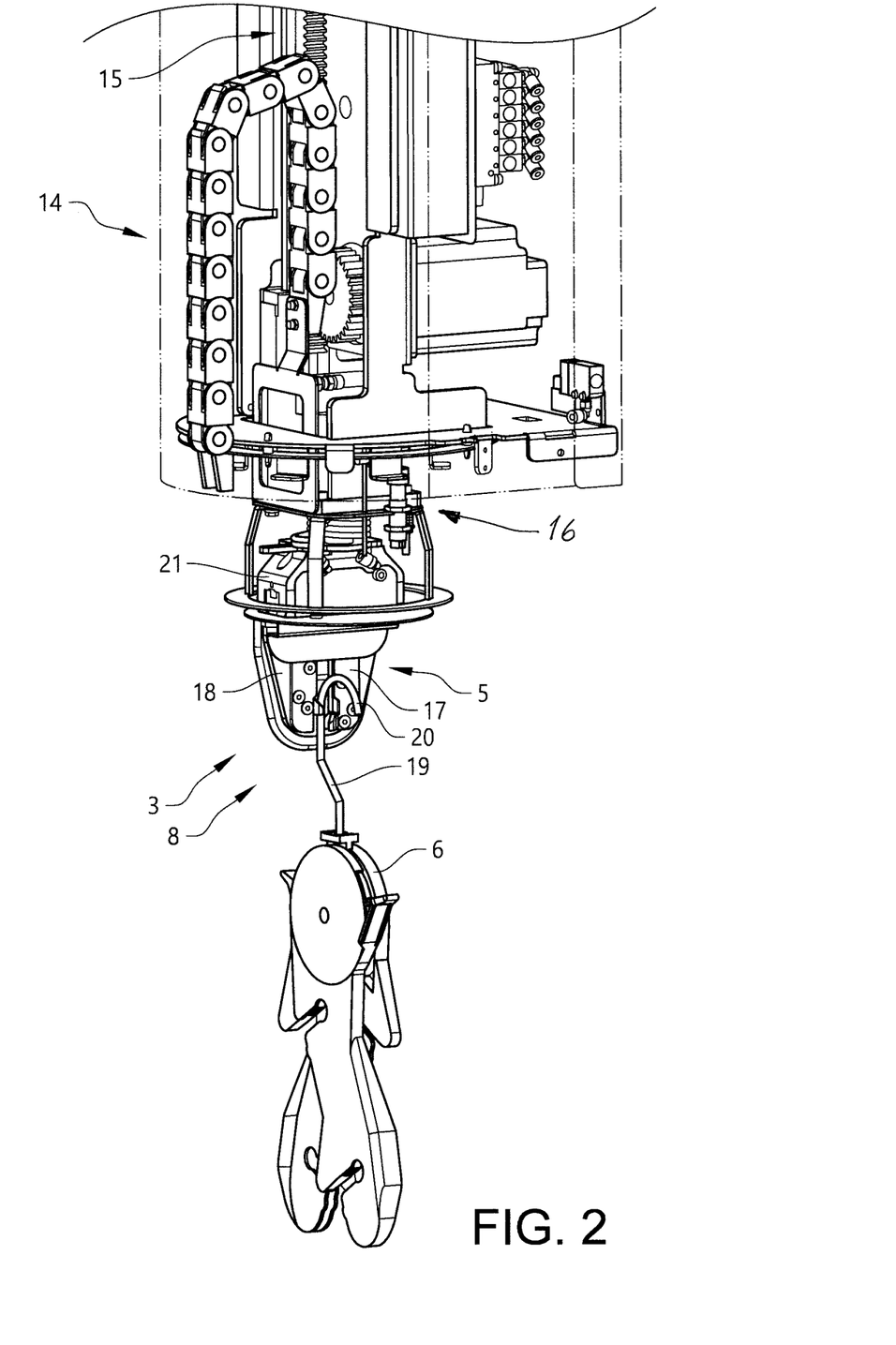
FIG. 2 shows an example of a gripping tool.

The housing 14 is adapted to be mounted in a hanging manner in a conveyor system, such that the upper part of the garment hanger handling device is attached to beams or the like arranged above the head of an operator, closer to the ceiling. In this way, there are no obstacles beneath the garment hanger handling device. The gripping tool 5 comprises two gripping jaws 17, 18 that are adapted to grip a garment hanger at the stem 19 or hook 20 of the garment hanger. In the shown example, the gripping jaws move linearly by a gripper actuator 21, where the gripping surfaces of the gripping tool are parallel at all times, both in a closed state and in an open state. Each gripping jaw comprises a V-shaped member adapted to securely position the stem or hook of the garment hanger in the gripping jaws and to secure that the stem is held firmly and in a correct position. The actuator may be powered by pressurized air or by electricity.

The conveyor system may comprise one or more loading stations 2. When more than one loading station is used, each loading station may receive different types of garment hangers, or may receive the same type of garment hanger in two different orientations. The garment hangers may be supplied to a loading station with the hook open to either the right side or the left side, i.e. right-oriented or left-oriented, depending on the conveyor that transports them. A garment hanger may also be asymmetric with a front side and a rear side. The front side may e.g. be linked to a left-oriented direction, i.e. when an empty garment hanger is held in a left-oriented direction at the mounting station, the front side points to the operator.

Depending on the complete conveyor system, e.g. other handling stations of the conveyor system and the layout of the conveyor tracks, the garment hangers are conveyed and delivered to a loading station with the garment hanger in a specific orientation. With two loading stations, the garment hanger handling device can receive and handle empty garment hangers with both orientations, which may be of advantage especially in larger conveyor systems.

When an empty garment hanger has been picked up at a loading station, the gripping tool moves the empty garment hanger to the mounting station 3, where a garment is hung on the garment hanger. The empty garment hanger is positioned in a predefined mounting position at the mounting station 3, where the predefined position is defined by an input signal.

In order to be able to position a garment hanger in a predefined mounting position, the garment hanger handling device is provided with a linear actuator 15 adapted to move the gripping tool 5 in a vertical direction. The linear actuator may be powered by pressurized air or by electricity. The linear actuator can move the gripping tool up and down such that the height of the mounting position and thus of the garment hanger can be adapted to the requirements. The height of the garment hanger may e.g. be adapted to the actual garment that is to be hung on the garment hanger. If a short shirt is to be hung, the mounting position may be relatively low, but for a longer jacket, the mounting position may be higher to avoid the jacket to touch the floor. The mounting position may also be adjusted in dependency of the length of the operator. A tall operator may require a higher mounting position than a short operator.

The garment hanger handling device is also provided with a rotational actuator 16 adapted to rotate the gripping tool 5 and thus the garment hanger around a vertical centre axis 13 of the garment hanger handling device 1. The rotational actuator may be powered by pressurized air or by electricity. In this way, the gripping tool 5 can position an empty garment hanger 6 in a predefined rotational position at the mounting station. It is also possible to rotate the garment hanger after a garment is hang on the garment hanger, such that the orientation of the garment hanger is adapted to the outfeed conveyor at a unloading station. The gripping tool may e.g. also be arranged on a tiltable actuator that allows the gripping tool to be oriented either in a vertical direction or a horizontal direction, or on a horizontal linear actuator that can move the gripping tool in a horizontal direction.

The conveyor system may comprise two different loading stations, where the empty garment hangers of a first loading station are received in one orientation and the empty garment hangers of a second loading station are received in another orientation. In this example, the gripping tool will pick up an empty garment hanger from the first loading station and will hold it at the mounting station in one orientation. An empty garment hanger of the second loading station is picked up and is then rotated by 180 degrees before it is moved to the mounting station, where it is also held in the same orientation.

The conveyor system may comprise a single loading station, where the empty garment hangers are received in one orientation. The gripping tool will pick up an empty garment hanger from the first loading station and will hold it at the mounting station in the same orientation. A garment is hung on the empty garment hanger and is then moved to the unloading station. In this example, the conveyor at the unloading station requires that the garment hangers are presented in the other orientation. The gripping tool will thus rotate the garment hanger by 180 degrees before it is delivered at the unloading station. In this way, there is no need for an additional hanger orientation mechanism.

The conveyor system may comprise a single loading station, where the empty garment hangers are received in one orientation. In this example, two different garment types are handled, e.g. a t-shirt without buttons and a shirt with buttons. The t-shirt are to be hung on an empty garment hanger that is held in the same orientation in the mounting station. The buttoned shirt is to be hung on a garment hanger in the other orientation at the mounting station. The gripping tool will thus move an empty garment hanger without rotation when a t-shirt is to be hung, and will rotate an empty garment hanger by 180 degrees when a buttoned shirt is to be hung. Both the t-shirt and the buttoned shirt will be forwarded to the same unloading station, where the garment hangers must have the same orientation. The garment hangers with t-shirts will thus be rotated by 180 degrees before they are delivered to the unloading station, and the buttoned shirts are delivered without rotation.

The amount of rotation that the gripping tool can rotate an empty garment hanger can be selected freely. It is e.g. possible to rotate an empty garment hanger by 90 degrees if the empty garment hangers are delivered to a loading station in a perpendicular orientation. It is also possible to hold an empty garment hanger at the mounting station in any rotational direction, depending e.g. on the garment that is to be hanged on the empty garment hanger. Some garments may e.g. be easier to hang if the garment hanger is oriented with an angle towards the operator. It would also be possible to rotate a garment hanger during the hanging of a garment on a garment hanger, in order to simplify the hanging of a garment. It would e.g. be possible to direct one arm of a garment hanger towards the operator, who treads a first arm of a shirt on the garment hanger, and then to rotate the garment hanger by 180 degrees such that the other arm of the garment hanger points towards the operator, who can then tread the other arm of the shirt on the garment hanger. This may simplify the hanging of some types of garments on garment hangers.

With the garment hanger handling device, it is thus possible to position an empty garment hanger in a desired predefined position at a mounting position, both with regards to a vertical position and to a rotational position around a vertical axis of the garment hanger handling device. The position of the garment hanger can thus be adapted to the type of garment hanger, the orientation of the garment hanger, the type of garment that is to be hung on the garment hanger and to the operator. The predefined mounting position is set by an input signal, and can be set for an individual garment hanger and/or an individual garment.

The predefined mounting position may be selected in different ways. In one example, the predefined position is selected in dependency of the garment that is to be hung on the empty garment hanger. Each garment hanger is provided with an identification of some type, e.g. a bar code or an RFID chip mounted on the garment hanger, such that each garment hanger can be identified individually. A data reader is provided at the loading station and each garment hanger is identified before the gripping tool picks up the empty garment hanger. The identity of a garment hanger is associated with the garment that is to be hung on the empty garment hanger. The gripping tool will then hold the garment hanger in the predefined position at the mounting station in dependency of the garment that is to be hung.

The garment that is to be hung on the empty garment hanger is identified before the garment is hung. The garment may be provided with an RFID chip that is read by a data reader, e.g. when the garment is picked up by an operator. The identity of a garment is associated with information stored in a database, where the information provides information of the garment. The type of garment may be associated with the identity of a garment hanger, such that the garment can be identified throughout the conveyor system. One advantage of associate a garment with a garment hanger is that each garment must not comprise a data holder. In some cases, all garments in a batch are of the same type. In this case, the garment type is predefined and each garment is associated with a specific garment hanger, such that the garment can be identified later in the conveyor system.

The garment may also be identified by the operator and the operator sends a signal indicating the type of garment to the garment hanger handling device, e.g. by pushing a switch corresponding to the type of garment or by selecting the garment type in a menu system of an operator panel. In this case, the type of garment is also associated with the specific garment hanger. The garment may also be identified by a vision system, or if all garments in a garment container are of the same type, by identifying the garment container. The predefined mounting position of the empty garment hanger can now be selected in dependency of the garment that is to be hung on the garment hanger.

The predefined mounting position may e.g. be adjusted in height depending on the actual garment that is to be hung on the garment hanger. If a short shirt is to be hung, the mounting position may be relatively low, but for a longer jacket, the mounting position may be higher to avoid the jacket to touch the floor. The rotation of the garment hanger may also be adjusted in dependency of the garment. One type of shirt may e.g. be hung on an empty garment hanger pointing in one direction, and another type of shirt may be hung on an empty garment hanger pointing in another direction.

The predefined mounting position may also be adjusted in dependency of the length of the operator. A tall operator may require a higher mounting position than a short operator. The garment hanger handling device can e.g. adjust the predefined mounting position by applying an offset to the predefined mounting position depending on the actual operator. The operator may e.g. be identified by an operator badge.

The type of garment hanger and/or the type of garment may also set the direction in which the garment hanger is unloaded at the unloading station. In one example, blue coats are forwarded to the unloading station with the garment hanger in one orientation, and white coats are forwarded to the unloading station with the garment hanger in another orientation.

When a garment is hung on a garment hanger, the garment hanger with the garment is forwarded to a release position 9 at an unloading station by the gripping tool. The gripping tool may hold the garment hanger at the mounting station for a predefined time interval, or the operator may issue a send signal when the hanging of a garment is completed and the garment hanger should continue to the unloading station. The operator may e.g. push a button when the hanging operation is completed. The gripping tool forwards the garment hanger with the garment to the release position at the unloading station, where the garment hanger is placed on an outfeed rail and is conveyed away from the garment hanger handling device. The gripping tool can position the garment hanger in a desired rotational direction at the outfeed station, depending on the unloading station.

The predefined mounting position may also be adjusted in other ways. The rotational direction of the garment hanger may e.g. be adapted to the requirements of the complete system. The opening of the hook of the garment hanger may e.g. point either inwards or outwards from the centre axis 13 of the garment hanger handling device. In this way, it is e.g. possible to hang a shirt with the front opening pointing away from the operator, regardless of the orientation of the shirt at the unloading device. Since the gripping tool can adapt the position of each garment hanger individually, the operator can always hang a garment in the most efficient way, regardless of the actual garment. The rotational position of the garment hanger can thus be adapted to the type of garment, to the type of garment hanger, and to the desired orientation of the garment.

The state of the garment hanger can also be selected at the mounting position. The empty garment hanger may be unfolded, i.e. be in a straight, normal state, adapted to hang open garments such as shirts, jackets, etc. The garment hanger may be also be folded, i.e. be in a collapsed state, adapted to hang garments through the neckline of the garment, such as t-shirts or buttoned shirts.

The type of garment may be detected by a data reader. The garment may be provided with a data holder, e.g. a bar code or an RFID tag, which can be read when the garment is picked up. The data holder is associated with stored information in a database. It is also possible for the operator to select the desired mounting position for the garment with a user interface. In the user interface, an operator may select the type of garment and the desired position of the gripping tool and thus the mounting position of the garment hanger. When the type of garment is selected, the gripping tool can adjust the mounting position to the selected garment before the garment is hung. Since the gripping tool can adjust the mounting position for each individual garment, each garment must not be identified in advance, but can be identified when it is hung on a garment hanger. This allows for a flexible use of the system when each garment is not provided with a data holder, and when assorted garments are handled. The information of the garment is in this example associated with the data holder of the garment hanger on which the garment is hung. This may also be of advantage when the same type of garment is handled for a longer period.

The identity of a garment hanger can also be detected by a data reader. The data reader for the garment hanger may be positioned at the loading station, such that the system knows which garment hanger that is going to be picked up. The garment hanger is in this example provided with a data holder, e.g. a bar code or an RFID tag. The conveyor system may e.g. comprise several loading stations with incoming conveyors, where one conveyor may convey one type of garment hanger. The gripping tool can for example select between the different types of garment hangers, e.g. depending on the garment that is picked up by an operator. Specific types of garments or different customers may e.g. require one type of a garment hanger, and others may require another type of garment hanger.

The garment hanger handling device can thus position each empty garment hanger in a predefined mounting position that is individually selected for each garment hanger and/or each garment. It is thus possible to hang assorted garments where each garment requires a different mounting position, both in height and in a rotational direction. The garment hanger handling device allows for a very flexible way to hang garments on empty garment hangers, where each mounting position is individually adapted to the actual garment. The gripping tool may e.g. pick up an empty garment hanger at a loading station and hold it at a mounting station in a predefined position, e.g. in a right-oriented position. Some garments are to be hung with the garment hanger in this position, and some garments are to be hung on a garment hanger in a left-oriented direction. When a garment is picked up by the operator, the garment may be identified by a data reader and the gripping tool may be rotated by 180 degrees if the garment is to be hung on a left-oriented garment hanger. If not, the garment hanger is not rotated. By pre-setting a first mounting position, even more time may be saved.

Figure 3:
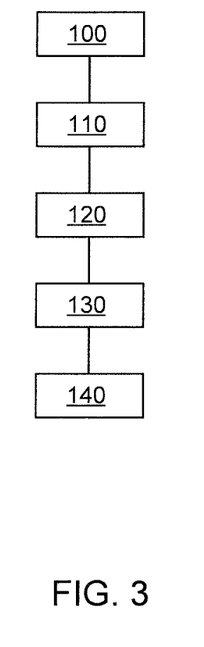
FIG. 3 shows a flow chart of the method according to the invention.

FIG. 3 shows a flow chart of the inventive method for positioning an empty garment hanger in an individual mounting position.

In step 100, an empty garment hanger is picked up at a loading station with a gripping tool. The gripping tool is adapted to grip the garment hanger at the hook or stem of the garment hanger, such that the gripping position is well-defined and such that the garment hanger does not displace during the handling of the garment hanger.

In step 110, a data signal identifying a garment that is to be hung on the garment hanger is read. The data signal may be provided on the garment, e.g. in the form of an RFID chip attached to the garment. It is also possible that an operator identifies the garment type and issues a signal indicative of the garment type, e.g. by using a menu system or a dedicated button. It would also be possible to use a vision system. The garment may also be associated with the identity of a garment hanger.

In step 120, the empty garment hanger is moved to a mounting station, where the garment is to be hung on the garment hanger by an operator.

In step 130, the position of the garment banger is adjusted in dependency of the data signal. By adjusting the mounting position of each garment hanger in dependency of the data identifying the garment, each garment can be hung on an individually adjusted garment hanger in an optimized manner.

In step 140, the garment hanger is held in the individual mounting position at the mounting station. The mounting position is held until the garment is hung on the garment hanger. When the hanging operation is completed, the operator issues a send signal such that the garment hanger with the garment can be forwarded to an unloading station.

In an additional step, the rotational orientation of the garment hanger around a vertical axis may be adjusted in dependency of the garment. The vertical position of the garment hanger may also be adjusted in dependency of the garment.

In an additional step, the rotational direction of the garment hanger may also be adapted to the type of unloading station, such that the rotational direction of the garment hanger is rotated on the way to the unloading station. In this way, the rotational direction of the garment hanger may be adapted for unloading stations having either a right-oriented direction or a left-oriented direction.

The invention is not limited to the embodiments described above, and instead a number of other variants and modifications are conceivable within the scope of the attached claims.

REFERENCE SIGNS

1: Garment hanger handling device
2: Loading station
3: Mounting station
4: Unloading station
5: Gripping tool
6: Garment hanger
7: Pick-up position
8: Mounting position
9: Release position
10: Rail
13: Centre axis
14: Housing
15: Linear actuator
16: Rotational actuator
17: Jaw
18: Jaw
19: Stem
20: Hook
21: Gripper actuator
50: Conveyor system

The invention claimed is:

1. A method for positioning an empty garment hanger in an individual mounting position, the method comprising:
   picking up an empty garment hanger at a loading station with a gripping tool;
   reading a data signal identifying a type of an individual garment that is to be hung on the empty garment hanger;
   moving the empty garment hanger to a mounting station;
   adjusting the individual mounting position of the empty garment hanger in dependency of the data signal, wherein the data signal includes information regarding a length of the individual garment, and wherein adjusting the individual mounting position comprises setting a vertical position of the empty garment hanger based on the length of the individual garment; and
   holding the empty garment hanger in the individual mounting position.

2. The method according to claim 1, further comprising:
   adjusting a rotational position of the empty garment hanger in dependency of the data signal.

3. The method according to claim 1, further comprising:
   adjusting a vertical position of the empty garment hanger in dependency of the data signal.

4. The method according to claim 1, further comprising:
   adjusting at least one of a rotational direction or a vertical position of the empty garment hanger in dependency of a signal identifying an operator.

5. The method according to claim 1, wherein the data signal identifying the type of the individual garment is associated with an identity of the empty garment hanger.

6. The method according to claim 1, wherein the data signal identifying the type of the individual garment is provided from data comprised on the individual garment.

7. The method according to claim 1, wherein the data signal identifying the type of the individual garment is provided from an operator.

8. The method according to claim 1, further comprising:
   holding the empty garment hanger in the individual mounting position until an operator has hung a garment on the empty garment hanger, and the operator issues a send signal.

9. The method according to claim 8, further comprising:
   forwarding the garment hanger to an unloading station.

10. The method according to claim 9, further comprising:
    adjusting a rotational direction of the garment hanger in dependency of a type of unloading station.

11. A method for positioning an empty garment hanger in an individual mounting position, the method comprising:
    picking up an empty garment hanger at a loading station with a gripping tool;
    reading a data signal identifying a type of an individual garment that is to be hung on the empty garment hanger;
    moving the empty garment hanger to a mounting station;
    adjusting the individual mounting position of the empty garment hanger in dependency of the data signal, wherein the data signal includes information regarding a length of the individual garment, wherein adjusting the individual mounting position includes associating the length of the individual garment with a specific garment hanger identity, and wherein adjusting the individual mounting position comprises setting a vertical position of the empty garment hanger based on the length of the individual garment; and
    holding the empty garment hanger in the individual mounting position.

12. The method of claim 11, wherein the data signal is provided by a data holder on the individual garment.

13. The method of claim 11, further comprising:
rotating the empty garment hanger around a vertical axis based on the data signal identifying the type of individual garment.

14. A method for positioning an empty garment hanger in an individual mounting position, the method comprising:
picking up an empty garment hanger at a loading station with a gripping tool;
reading a data signal identifying a type of an individual garment that is to be hung on the empty garment hanger;
moving the empty garment hanger to a mounting station;
adjusting the individual mounting position of the empty garment hanger in dependency of the data signal, wherein the data signal includes information regarding a length of the individual garment and a height of an operator hanging the individual garment, and wherein adjusting the individual mounting position comprises setting a vertical position of the empty garment hanger based on the length of the individual garment; and
holding the empty garment hanger in the individual mounting position.

15. The method of claim 14, wherein adjusting the individual mounting position comprises setting a vertical position of the empty garment hanger based on the height of the operator.

16. The method of claim 14, further comprising:
identifying the operator via an operator badge.

17. The method of claim 14, wherein adjusting the individual mounting position comprises applying an offset to a predefined mounting position based on the height of the operator.

18. The method of claim 14, further comprising:
rotating the empty garment banger around a vertical axis based on a preference of the operator.

19. The method of claim 14, wherein the individual mounting position is adjusted such that the operator achieves an ergonomic working position when hanging the individual garment.

* * * * *